US 7,061,665 B2

(12) United States Patent
Sobe et al.

(10) Patent No.: US 7,061,665 B2
(45) Date of Patent: Jun. 13, 2006

(54) OPTICAL FIBER TRANSMISSION SYSTEM, RAMAN GAIN SLOPE MEASURING DEVICE AND RAMAN GAIN SLOPE MEASURING METHOD

(75) Inventors: Masaaki Sobe, Tokyo (JP); Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 477 days.

(21) Appl. No.: 10/283,127

(22) Filed: Oct. 30, 2002

(65) Prior Publication Data
US 2003/0090780 A1 May 15, 2003

(30) Foreign Application Priority Data
Oct. 31, 2001 (JP) ............................ 2001-335304

(51) Int. Cl.
H04B 10/12 (2006.01)
H04B 10/08 (2006.01)

(52) U.S. Cl. ........................................ 359/334; 398/37
(58) Field of Classification Search ................ 359/334; 398/37
See application file for complete search history.

(56) References Cited

U.S. PATENT DOCUMENTS

| 5,808,785 | A * | 9/1998 | Nakabayashi .......... 359/337.13 |
| 5,883,736 | A | 3/1999 | Oshima et al. |
| 6,081,323 | A | 6/2000 | Mahgerefteh et al. |
| 6,388,801 | B1 * | 5/2002 | Sugaya et al. ............... 359/334 |
| 6,441,950 | B1 * | 8/2002 | Chen et al. .................. 359/334 |
| 6,441,951 | B1 * | 8/2002 | Tanaka et al. ............... 359/334 |
| 6,452,716 | B1 | 9/2002 | Park et al. |
| 6,519,026 | B1 | 2/2003 | Holland |
| 6,738,132 | B1 | 5/2004 | Sobe et al. |
| 6,823,107 | B1 * | 11/2004 | Muro et al. .................... 385/27 |
| 2002/0097481 | A1 | 7/2002 | Du et al. |
| 2002/0118442 | A1 | 8/2002 | Ghera et al. |
| 2004/0160664 | A1 | 8/2004 | Sobe et al. |

FOREIGN PATENT DOCUMENTS

| JP | 7-311120 | 11/1995 |
| JP | 9-230399 | 9/1997 |
| JP | 2001-109025 | 4/2001 |
| JP | 2002-202224 | 7/2002 |
| JP | 2002-250674 | 9/2002 |

OTHER PUBLICATIONS

Kiyofumi Mochizuki, et al., "Amplified Spontaneous Raman Scattering in Fiber Raman Amplifiers," *Journal of Lightwave Technology*, vol. LT-4, No. 9, pp. 1328-1333 (Sep. 1986).

Yasuhiro Aoki, "Properties of Fiber Raman Amplifiers and Their Applicability to Digital Optical Communication Systems," *Journal of Lightwave Technology*, vol. 6, No. 7, pp. 1225-1239 (Jul. 1988).

* cited by examiner

*Primary Examiner*—Jack Keith
*Assistant Examiner*—Eric Bolda
(74) *Attorney, Agent, or Firm*—Foley & Lardner LLP (57) ABSTRACT

In Raman gain slope measurement method and device measures Raman gain slope which is a value obtained by normalizing a gain generated by Raman amplification caused by pump light incident on an optical fiber by optical power of the pump light in question. The method and device measures the power of noise light and operates based on a relationship between the optical power of pump light incident on an optical fiber and the optical power of the measured noise light generated by the application of the pump light, Raman gain slope of the optical fiber in question is thus calculated.

33 Claims, 7 Drawing Sheets

OPTICAL FIBER TRANSMISSION SYSTEM, RAMAN GAIN SLOPE MEASURING DEVICE AND RAMAN GAIN SLOPE MEASURING METHOD

BACKGROUND OF THE INVENTION

1. Field of the Invention

The present invention relates to an optical fiber transmission system, a Raman gain slope measuring device and a Raman gain slope measuring method which enable measurement of Raman gain slope of an optical fiber transmission line.

2. Description of the Related Art (Distributed Raman Amplification)

Figure 8:
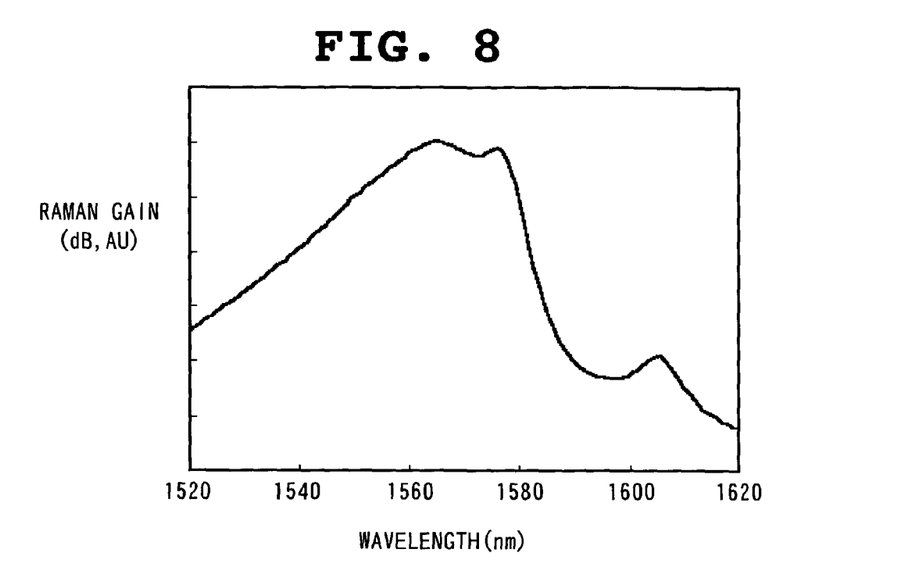
FIG. 8 is a diagram for use in explaining a Raman gain profile.

In the field of communication systems using an optical fiber transmission line, development is under way for commercializing distributed Raman amplification (DRA) techniques. Optical fiber for use in basic transmission networks today employs quartz glass as a base material. Raman amplification is a phenomenon that takes place when a signal light and a pump light having a frequency 13 THz higher than that of the signal light are simultaneously incident on a quartz glass causing part of energy of the pump light to be transferred to the signal light through the induced Raman scattering effect of the quartz glass. As a result, the signal light is subjected to amplification. Gain obtained as a result of Raman amplification will be referred to as a Raman gain hereinafter. An actual Raman gain has a wavelength dependency as shown in FIG. 8, and will be referred to as a Raman gain profile hereinafter.

Distributed Raman amplification is a mode of applying pump light to an optical fiber which transits signal light to obtain the Raman amplification effect with the optical fiber transmission line itself as an amplification medium. Since a propagation loss of a transmission line is compensated for by Raman amplification, an optical fiber transmission system using distributed Raman amplification enables the extension of a distance in which the signal is transmittable.

(Necessity of Measurement of Raman Gain Slope)

A Raman gain (dB), which is generated when pump light of a certain power (W) is applied to an optical fiber as a Raman amplification medium, normalized by the power of the pump light, is referred to as Raman gain slope (dB/W). In the following, a description is given showing the importance of measuring the Raman gain slope in the distributed Raman amplification process.

Raman gain slope varies with an individual fiber. To begin with, optical fibers laid as basic transmission networks have various kinds and Raman gain slope depending on a mode field diameter (core diameter), an amount of $GeO_2$ addition, absorption of water (OH), etc. of the optical fibers. These parameters also vary with the manufacturer, the manufacturing time and the particular lot of the optical fiber.

Another chief factor responsible for Raman gain slope variation is station loss. In a large terminal station or a repeater plant in particular, there exist loses of a few dB from connectors at several sites from the room where a pump light source is placed to the actual transmission line optical fiber. With a transmission system using no distributed Raman amplification, station loss can be taken into consideration together with a section loss. In distributed Raman amplification, however, a loss caused before the pump light reaches the transmission line optical fiber is special and therefore needs another specification.

Thus, when distributed Raman amplification is conducted on an existing transmission line whose parameters affecting gain vary widely, it is difficult to predict in advance the pump power required for obtaining a desired Raman gain. Adjustment at the site is therefore needed which costs labor and time.

Elimination of the need for adjustment could be realized if conditions of a site such as properties of a transmission line optical fiber and loss characteristics of a terminal station or a repeater plant can be measured as Raman gain slope. This enables pump power required for obtaining a certain gain to be measured with high precision, thereby enabling a Raman gain to be controlled dynamically.

Raman gain exhibits the configuration as shown in FIG. 8 with respect to a wavelength of signal light. Raman gain slope is a function of a frequency difference between the pump light and the test light. In a typical transmission line made of quartz glass optical fibers, Raman gain slope has a similar figure in the direction of a gain axis. Since a frequency difference at which a gain has a peak is about 13 THz, gain slope of a certain transmission line will be denoted as a signal wavelength 13 THz larger than the pump wavelength unless indicated otherwise in the following.

(Conventional Raman Gain slope Measuring Method)

As described above, while actual measurement of Raman gain slope is crucial, there exists no simple actual method for making such measurements at site.

Figure 6:
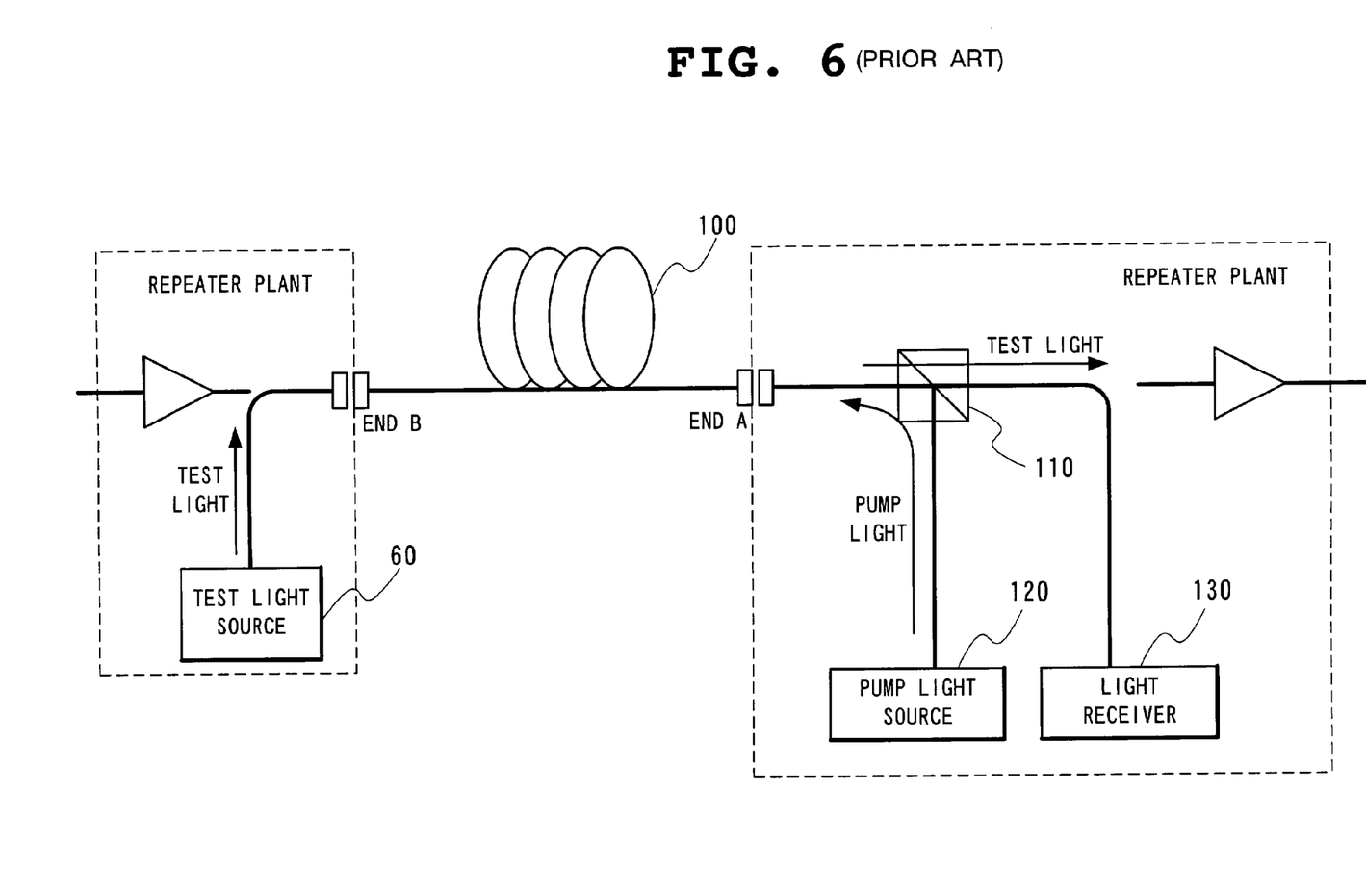
FIG. 6 is a diagram for use in explaining a conventional Raman gain slope measuring method which requires work at opposite ends of a transmission line.

When work at opposite ends of a transmission line is possible as in a laboratory, measurement of Raman gain slope can be realized by such arrangement as shown in FIG. 6. Provided at one end of a transmission line optical fiber 100 is a test light source 60 having a signal wavelength band whose Raman gain slope is to be measured and provided at the other end is a WDM (Wavelength Division Multiplexing) coupler 110 for multiplexing and demultiplexing a pump wavelength band and a signal wavelength band. A pump light source 120 is connected to a pump wavelength band port of the WDM coupler 110 and a light receiver 130 for measuring power of the signal light is connected to a signal wavelength band port. Examples of the light receiver 130 are such measuring apparatuses as an optical spectrum analyzer and an optical power meter and also a simple light receiving element such as a photo-diode of suitable performance.

With the test light applied to a transmission line and the pump light stopped, one first measures the power of the test light (P1[dBm]) detected at the light receiver 130. Next, with the pump light source 120 output, measure power (P2[dBm]) of the test light detected at the light receiver 130. A difference between the powers P2 and P1 of the test light is a Raman gain (dB) that the test light obtains. One may normalize the gain by the power of the pump light to obtain the Raman gain slope (dB/W). Since this method allows measurement with a simple light receiving element, it can be realized at relatively low cost. It, however, has a problem in that the method is not easy to perform because the opposite ends of a transmission line are apart from each other in general.

(Conventional Raman Gain slope Measuring Method Realized by Work Only at One End of Transmission Line)

Figure 7:
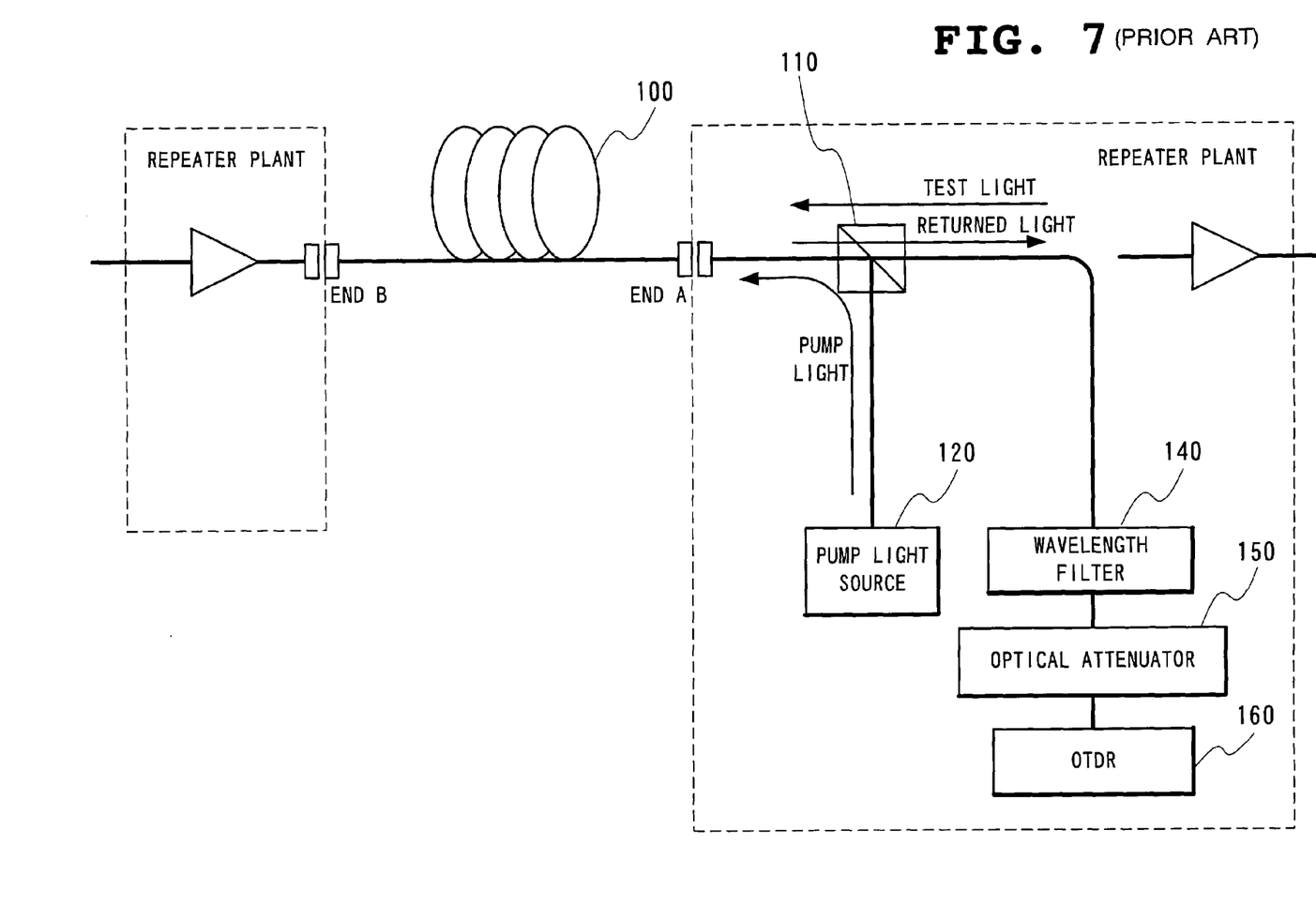
FIG. 7 is a diagram for use in explaining a conventional Raman gain slope measuring method which is realized by work only at one end of a transmission line.

Work performed only at one end of the transmission line, such as illustrated in FIG. 7, also enables measurement of Raman gain slope. In this method, a Raman gain is measured by using an OTDR (optical time domain reflectometer) 160. The OTDR 160 is a means for detecting a failure point of an optical fiber by time-resolution measurement of an amount of relay scattered light of an optical pulse which enters the optical fiber and is scattered and returned. Shown in FIG. 7 is a structure in which test light returned scattering is detected by the OTDR 160 through a wavelength filter 140 and an optical attenuator 150. Since with a Raman gain, relay scattered light is increased by as much as the Raman gain, the Raman gain can be measured.

The embodiment of FIG. 7, however, requires a special and expensive OTDR device to be provided at a DRA installation site. The method also requires a temporary change of the transmission line wiring for connecting the OTDR device, which invites problems in costs and workability.

Measuring the Raman gain slope using the conventional method shown in FIG. 6 requires disposition of measuring apparatuses, light sources and workers at opposite ends of a transmission line. On the other hand, although such a conventional method as shown in FIG. 7 enables measurement of Raman gain slope even when work is possible only at one end of a transmission line, it requires an expensive OTDR device to be provided at the site and also transmission line wiring to be changed for connecting the OTDR device, leaving problems to be solved in costs and workability.

SUMMARY OF THE INVENTION

An object of the present invention is to provide an optical fiber transmission system, a Raman gain slope measuring device and a Raman gain slope measuring method enabling Raman gain slope measurement which is excellent in workability and cost performance and which can be realized by work at one end of a transmission line and requires no change of wiring at the signal transmission state.

According to the first aspect of the invention, a Raman gain slope measuring method of measuring Raman gain slope which is a value obtained by normalizing a gain generated by Raman amplification caused by pump light incident on an optical fiber by power of the pump light in question, comprising the step of measuring power of noise light generated by Raman amplification in an optical fiber to be measured to obtain Raman gain slope of the optical fiber in question.

In the preferred construction, the power of the pump light incident on the optical fiber is changed in two or more stages and an amount of change of noise light which is a value obtained by normalizing an amount of change of power of corresponding the noise light by an amount of change of the power of the pump light is measured to obtain Raman gain slope of the optical fiber in question.

In another preferred construction, the Raman gain slope measuring method further comprises a first step of obtaining, from amounts of change of noise light obtained relative to a plurality of kinds of optical fibers whose Raman gain slope is known, a relational expression between an amount of change of noise light and Raman gain slope, and a second step of calculating, from an amount of change of noise light of an optical fiber whose gain slope is to be measured, Raman gain slope of the optical fiber in question based on the relational expression between the amount of change of noise light and Raman gain slope which is obtained at the first step.

In another preferred construction, at the first step, in the measurement made relative to a plurality of kinds of optical fibers, an amount of change of noise light and Raman gain slope are measured consistently without changing a measurement system with respect to each optical fiber.

In another preferred construction, at the first step, with the relational expression between the amount of change of noise light and Raman gain slope assumed to be a linear expression, a coefficient of the linear expression is calculated.

In another preferred construction, by substituting the amount of change of noise light of the optical fiber to be measured in the linear expression which is the relational expression between the amount of change of noise light and Raman gain slope obtained at the first step, Raman gain slope of the optical fiber in question is calculated.

In another preferred construction, the power of the pump light is power which realizes a Raman gain not less than 3 dB by the application to the optical fiber.

In another preferred construction, the power of the pump light incident on said optical fiber is changed in two or more stages and an amount of change of noise light which is a value obtained by normalizing an amount of change of power of corresponding said noise light by an amount of change of the power of said pump light is measured to obtain Raman gain slope of the optical fiber in question, the power of said pump light is power which realizes a Raman gain not less than 3 dB by the application to said optical fiber.

In another preferred construction, the Raman gain slope measuring method further comprises a first step of obtaining, from amounts of change of noise light obtained relative to a plurality of kinds of optical fibers whose Raman gain slope is known, a relational expression between an amount of change of noise light and Raman gain slope, and a second step of calculating, from an amount of change of noise light of an optical fiber whose gain slope is to be measured, Raman gain slope of the optical fiber in question based on said relational expression between the amount of change of noise light and Raman gain slope which is obtained at said first step, wherein the power of said pump light is power which realizes a Raman gain not less than 3 dB by the application to said optical fiber.

According to the second aspect of the invention, a Raman gain slope measuring device for measuring Raman gain slope which is a value obtained by normalizing a gain generated by Raman amplification caused by pump light incident on an optical fiber by power of the pump light in question, comprises means for measuring power of noise light generated by Raman amplification in an optical fiber to be measured to obtain Raman gain slope of the optical fiber in question.

In the preferred construction, the Raman gain slope measuring device further comprises means for changing the power of the pump light incident on the optical fiber in two or more stages and measuring an amount of change of noise light which is a value obtained by normalizing an amount of change of power of corresponding the noise light by an amount of change of the power of the pump light to obtain Raman gain slope of the optical fiber in question.

In another preferred construction, the Raman gain slope measuring device further comprises first means for obtaining, from amounts of change of noise light obtained relative to a plurality of kinds of optical fibers whose Raman gain slope is known, a relational expression between an amount of change of noise light and Raman gain slope, and second means for calculating, from an amount of change of noise light of an optical fiber whose gain slope is to be measured, Raman gain slope of the optical fiber to be measured in question based on the relational expression between the amount of change of noise light and Raman gain slope which is obtained by the first means.

In another preferred construction, the Raman gain slope measuring device further comprises a pump light source for making pump light be incident on the optical fiber, optical coupling means for coupling the pump light in question with the optical fiber in question, light receiving means for measuring power of noise light output from the optical fiber in question, and light distributing means for introducing the noise light in question from the optical fiber in question into the light receiving means in question.

In another preferred construction, at the first means, in the measurement made relative to a plurality of kinds of optical fibers, an amount of change of noise light and Raman gain slope are measured consistently without changing a measurement system with respect to each optical fiber.

In another preferred construction, at the first means, with the relational expression between the amount of change of noise light and Raman gain slope assumed to be a linear expression, a coefficient of the linear expression is calculated.

In another preferred construction, by substituting the amount of change of noise light of the optical fiber to be measured in the linear expression which is the relational expression between the amount of change of noise light and Raman gain slope obtained by the first means, Raman gain slope of the optical fiber to be measured in question is calculated.

In another preferred construction, the power of the pump light is power which realizes a Raman gain not less than 3 dB by the application to the optical fiber.

In another preferred construction, the Raman gain slope measuring device further comprises means for changing the power of the pump light incident on said optical fiber in two or more stages and measuring an amount of change of noise light which is a value obtained by normalizing an amount of change of power of corresponding said noise light by an amount of change of the power of said pump light to obtain Raman gain slope of the optical fiber in question, wherein the power of said pump light is power which realizes a Raman gain not less than 3 dB by the application to said optical fiber.

In another preferred construction, the Raman gain slope measuring device further comprises first means for obtaining, from amounts of change of noise light obtained relative to a plurality of kinds of optical fibers whose Raman gain slope is known, a relational expression between an amount of change of noise light and Raman gain slope, and second means for calculating, from an amount of change of noise light of an optical fiber whose gain slope is to be measured, Raman gain slope of the optical fiber to be measured in question based on said relational expression between the amount of change of noise light and Raman gain slope which is obtained by said first means, wherein the power of said pump light is power which realizes a Raman gain not less than 3 dB by the application to said optical fiber.

In another preferred construction, the Raman gain slope measuring device being incorporated in a transmission or reception terminal station or a repeater plant of an optical fiber transmission system, measures gain slope of the optical fiber as a signal transmission line, and is applied to Raman amplification targeting signal light transmitted through the optical fiber as a signal transmission line.

In another preferred construction, the Raman gain slope measuring device being incorporated in a transmission or reception terminal station or a repeater plant of an optical fiber transmission system, measures gain slope of the optical fiber as a signal transmission line, and is applied to Raman amplification targeting signal light transmitted through said optical fiber as a signal transmission line, further comprises means for changing the power of the pump light incident on said optical fiber in two or more stages and measuring an amount of change of noise light which is a value obtained by normalizing an amount of change of power of corresponding said noise light by an amount of change of the power of said pump light to obtain Raman gain slope of the optical fiber in question, In another preferred construction, the Raman gain slope measuring device being incorporated in a transmission or reception terminal station or a repeater plant of an optical fiber transmission system, measures gain slope of the optical fiber as a signal transmission line, and is applied to Raman amplification targeting signal light transmitted through said optical fiber as a signal transmission line, further comprises first means for obtaining, from amounts of change of noise light obtained relative to a plurality of kinds of optical fibers whose Raman gain slope is known, a relational expression between an amount of change of noise light and Raman gain slope, and second means for calculating, from an amount of change of noise light of an optical fiber whose gain slope is to be measured, Raman gain slope of the optical fiber to be measured in question based on said relational expression between the amount of change of noise light and Raman gain slope which is obtained by said first means.

According to another aspect of the invention, an optical fiber transmission system for transmitting signal light from a transmission terminal station to a reception terminal station through an optical fiber as a signal transmission line, wherein the transmission or reception terminal station or a repeater plant includes a Raman gain slope measuring device for measuring Raman gain slope which is a value obtained by normalizing a gain generated by Raman application caused by pump light incident on the optical fiber by power of the pump light in question, the Raman gain slope measuring device including means for obtaining, by measuring power of noise light generated by Raman amplification in an optical fiber to be measured, Raman gain slope of the optical fiber in question.

In the preferred construction, the Raman gain slope measuring device includes means for changing the power of the pump light incident on the optical fiber in two or more stages and measuring an amount of change of noise light which is a value obtained by normalizing an amount of change of power of corresponding the noise light by an amount of change of the power of the pump light to obtain Raman gain slope of the optical fiber in question.

In another preferred construction, the Raman gain slope measuring device includes first means for obtaining, from amounts of change of noise light obtained relative to a plurality of kinds of optical fibers whose Raman gain slope is known, a relational expression between an amount of change of noise light and Raman gain slope, and second means for calculating, from an amount of change of noise light of an optical fiber whose gain slope is to be measured, Raman gain slope of the optical fiber to be measured in question based on the relational expression between the amount of change of noise light and Raman gain slope which is obtained by the first means.

In another preferred construction, the Raman gain slope measuring device includes a pump light source for making pump light be incident on the optical fiber, optical coupling means for coupling the pump light in question with the optical fiber in question, light receiving means for measuring power of noise light output from the optical fiber in question, and light distributing means for introducing the noise light in question from the optical fiber in question into the light receiving means in question.

In another preferred construction, the Raman gain slope measuring device includes means for measuring power of the signal light transmitted from a signal light source which emits signal light through the optical fiber with respect to power of each stage of the pump light incident on the optical fiber to measure Raman gain slope of the optical fiber.

In another preferred construction, at the first means, in the measurement made relative to a plurality of kinds of optical fibers, an amount of change of noise light and Raman gain slope are measured consistently without changing a measurement system with respect to each optical fiber.

In another preferred construction, in the first means, with the relational expression between the amount of change of noise light and Raman gain slope assumed to be a linear expression, a coefficient of the linear expression is calculated.

In another preferred construction, the Raman gain slope measuring device substitutes the amount of change of noise light of the optical fiber to be measured in the linear expression which is the relational expression between the amount of change of noise light and Raman gain slope obtained by the first means to calculate Raman gain slope of the optical fiber to be measured in question.

In another preferred construction, the power of the pump light is power which realizes a Raman gain not less than 3 dB by the application to the optical fiber.

In another preferred construction, said Raman gain slope measuring device includes means for changing the power of the pump light incident on said optical fiber in two or more stages and measuring an amount of change of noise light which is a value obtained by normalizing an amount of change of power of corresponding said noise light by an amount of change of the power of said pump light to obtain Raman gain slope of the optical fiber in question, the power of said pump light is power which realizes a Raman gain not less than 3 dB by the application to said optical fiber.

In another preferred construction, said Raman gain slope measuring device includes first means for obtaining, from amounts of change of noise light obtained relative to a plurality of kinds of optical fibers whose Raman gain slope is known, a relational expression between an amount of change of noise light and Raman gain slope, and second means for calculating, from an amount of change of noise light of an optical fiber whose gain slope is to be measured, Raman gain slope of the optical fiber to be measured in question based on said relational expression between the amount of change of noise light and Raman gain slope which is obtained by said first means, the power of said pump light is power which realizes a Raman gain not less than 3 dB by the application to said optical fiber.

According to the present invention, power of noise light is measured which is generated by Raman amplification in an optical fiber to be measured, power of pump light incident on the optical fiber is changed in two or more stages, an amount of change of noise light is obtained which is a value obtained by normalizing an amount of change of the power of the corresponding noise light by an amount of change of the power of the pump light, and the amount of change of the noise light is substituted in a relational expression between an amount of change of noise light and Raman gain slope to obtain Raman gain slope of the optical fiber in question.

Also, the present invention consistently measures an amount of change of noise light with respect to each of a plurality of kinds of optical fibers whose Raman gain slope is known without changing a measuring line, obtains a relational expression between an amount of change of the noise light and Raman gain slope based on the measurement result and substitutes the amount of change of the noise light of an optical fiber to be measured in the relational expression, thereby obtaining Raman gain slope of the optical fiber.

According to the present invention, with a relational expression between an amount of change of noise light and Raman gain slope represented as a linear expression, the relational expression is determined by calculating a coefficient of the linear expression.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, principle of the present invention will be described.

When pump light for Raman amplification is made incident on a transmission line, noise light according to an amount of a Raman gain is generated. Reversely calculating a Raman gain from a measurement value of power of the noise light is the essential feature of the present invention. Components of noise light are mainly composed of amplified spontaneous Raman scattering derived from Raman amplification, with little noise light derived from thermal noise, any of which noise light is generated according to a Raman gain and therefore can be used for the measurement of Raman gain slope.

Analytic and quantitative consideration of power of noise light derived from Raman amplification is reported in the following literatures.

Kiyofumi Mochizuki, Noboru Edagawa and Yoshinao Iwamoto, "Amplified Spontaneous Raman Scattering in Fiber Raman Amplifier", J. Lightwave Technol., 4, (9), pp. 1328–1333 (1986).

Yasuhiro Aoki, "Properties of Fiber Raman Amplifiers and Their Application to Digital Optical Communication System", J. Lightwave Technol., 6, (7), pp. 1225–1239 (1988).

According to these literatures, power of noise light in backward pump Raman amplification is expressed by the following expression 1:

$$NP = \Delta\lambda \times h \times c^2 / \lambda_0^3 \times [4.34/G \times \exp(G/4.34) - (4.34/G + 1)]$$  (Expression 1), wherein NP represents power of noise light transited through a rectangular optical filter having a central wavelength of $\lambda_0$ and a bandwidth of $\Delta\lambda$. Also assume that a Planck's constant denoted as h is $6.63 \times 10^{-34}$ (J·s) and luminous flux denoted as C is $3.00 \times 10^8$ (m/s).

Figure 9:
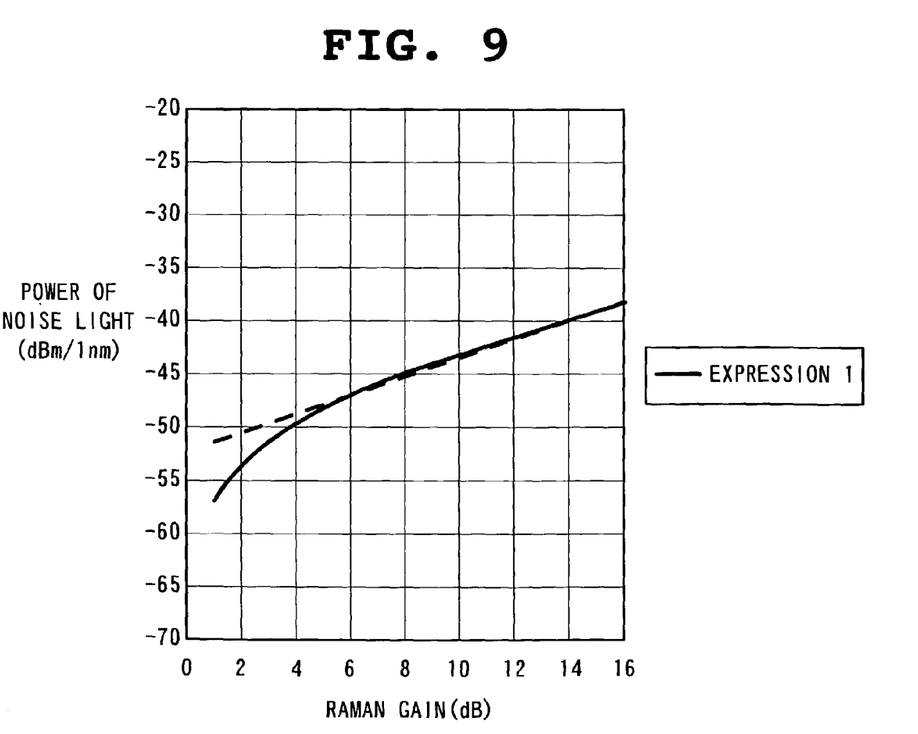
FIG. 9 is a diagram for use in explaining a correlation between a Raman gain and an amount of noise light generated.

The amount of power of noise light generated relative to a Raman gain G obtained according to the expression is shown in FIG. 9. In FIG. 9, assume that $\lambda_0 = 1.55$ μm and $\Delta\lambda = 1$ nm. It is known that in a region of a Raman gain G which thus satisfies the condition that $G \geq 3$ dB, power of noise light expressed in dBm and a gain G expressed in dB are substantially proportional to each other. That is, in FIG. 9, the change in the power of noise light according to the change in the gain G (shown with a solid line) is substantially coincident with a straight reference line (shown with a dashed line) if the gain G is more than 3 dB. Therefore, correcting the relationship between the gain G and the power of noise light in advance enables the reverse calculation from the power of noise light to a Raman gain.

In a case where powers of noise light observed when the power of the pump light incident on the transmission line is changed to PP1(W) and PP2(W)(PP1) are NP1(dBm) and NP2(dBm), respectively, an amount $\Delta N$(dB/W) of change of power of noise light is defined to be $\Delta N = (NP2 - NP1)/(PP2 - PP1)$.

Figure 2:
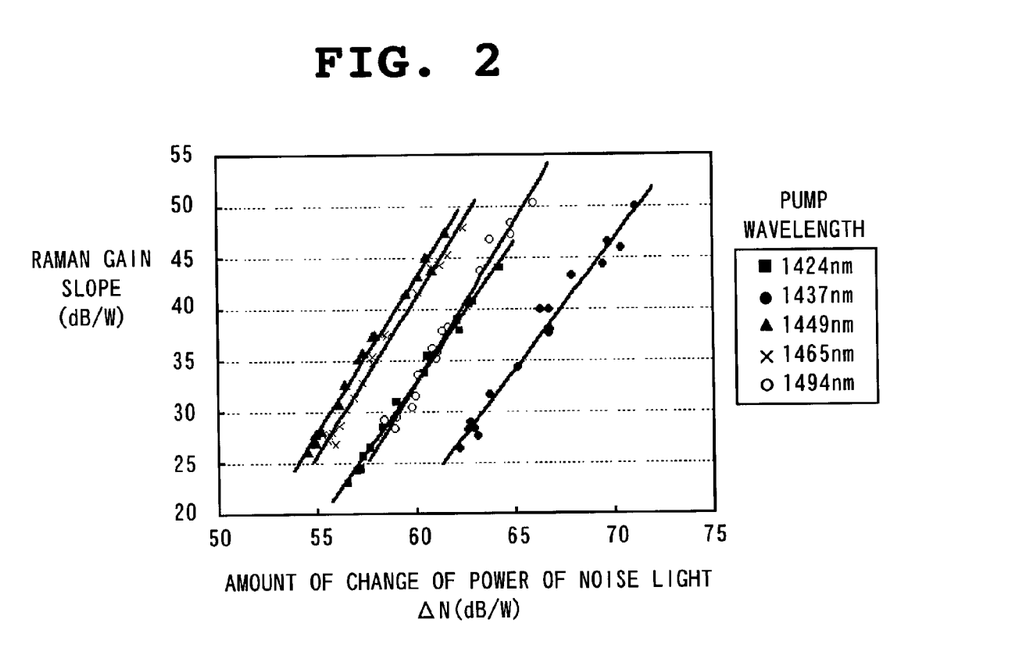
FIG. 2 is a diagram for use in explaining a correlation between an amount ΔN of change of power of noise light and Raman gain slope.

The relationship between the amount $\Delta N$ of change of power of noise light and Raman gain slope $\Gamma$ measured independently by the method shown in FIG. 6 is expressed as illustrated in FIG. 2. It can be found that the relationship exhibits a straight line expressed by the following linear expression 2:

$$\gamma = A \times \Delta N + B$$  (Expression 2), wherein values of A and B are coefficients determined by a relationship between a pump wavelength and wavelength characteristics of the noise light measurement system, that is, coefficients determined by an observation line.

Figure 1:
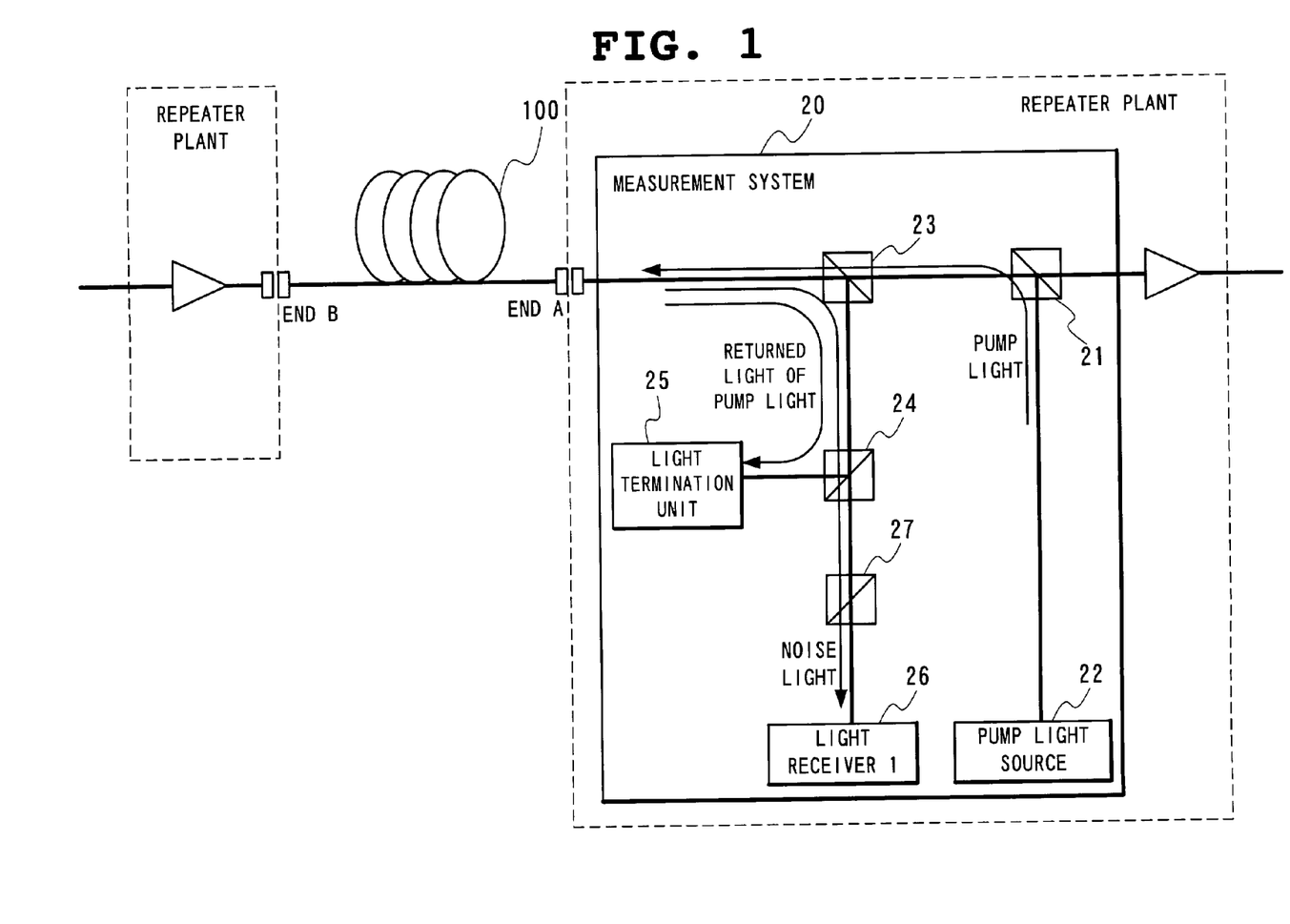
FIG. 1 is a diagram showing a structure of an optical fiber transmission system for conducting measurement according to an embodiment of the present invention.
Figure 3:
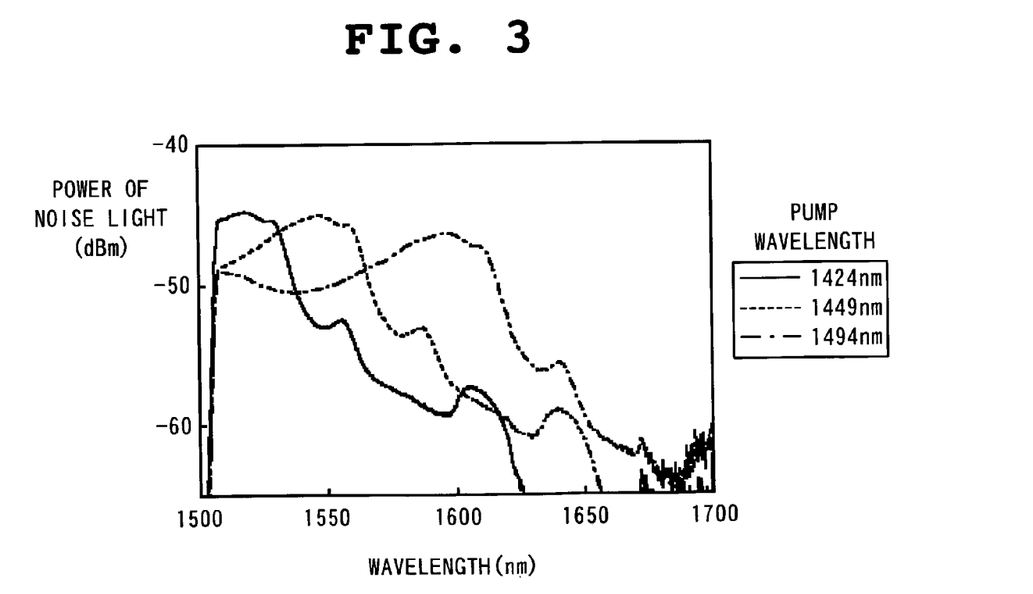
FIG. 3 is a diagram for use in explaining wavelength characteristics of a noise light measurement system.

FIG. 1 is a diagram showing a structure of an optical fiber transmission system which conducts the main measurement according to an embodiment of the present invention. Wavelength characteristics of a noise light measurement system 20 (Raman gain slope measuring device) are determined by the wavelength characteristics of the light receiver sensitivity and the wavelength characteristics of the path from end A to a receiver in FIG. 1. FIG. 3 shows noise light spectra measured by a light receiver 26 of FIG. 1 which are obtained relative to several pump wavelengths. Noise light having a wavelength shorter than about 1500 nm is cut off by a WDM coupler. The total amount of power of the noise light observed is affected mainly by the cutting quality of the filter. Correspondence therebetween is enabled by the coefficients A and B once the filter is determined.

In addition, the values of the coefficients A and B depend also on the wavelength difference between the pump wavelength and the gain measurement wavelength (more precisely, a frequency difference). FIG. 2 shows the Raman gain slope at peak wavelengths (13 THz larger than the pump wavelength) of a Raman gain profile when the pump wavelengths are 1424 nm, 1437 nm, 1449 nm, 1465 nm and 1494 nm. Correspondence therebetween is also enabled by the coefficients A and B when the pump wavelength and a wavelength whose gain is to be measured are determined in advance.

Thus, each of the coefficients A and B in the linear expression 2 are coefficients depending only on the measurement system 20 and a parameter as of measurement. It is therefore possible to reversely calculate Raman gain slope $\gamma$ from the measurement of an amount $\Delta N$ of change of the power of the noise light once the coefficients A and B are corrected in advance at the predetermined measurement system 20 under predetermined measurement conditions (pump light wavelength and wavelength characteristics of the noise light measurement system).

Measurement of the power of the noise light can be made at an end of the transmission line on the side which the pump light enters. In addition, power of the noise light can be measured by a simple and inexpensive light receiver for measuring a direct current component. Therefore, work only at one end of the transmission line realizes Raman gain slope measurements which are excellent in workability and cost performance. Moreover, such a structure as shown in FIG. 1 eliminates the need of changing wiring at the measurement site of the Raman gain slope and at the transmission of a signal, thereby preventing such troubles as a failure and breakage involved in wiring change and further enabling remote execution and operation for Raman gain slope measurements.

Figure 5:
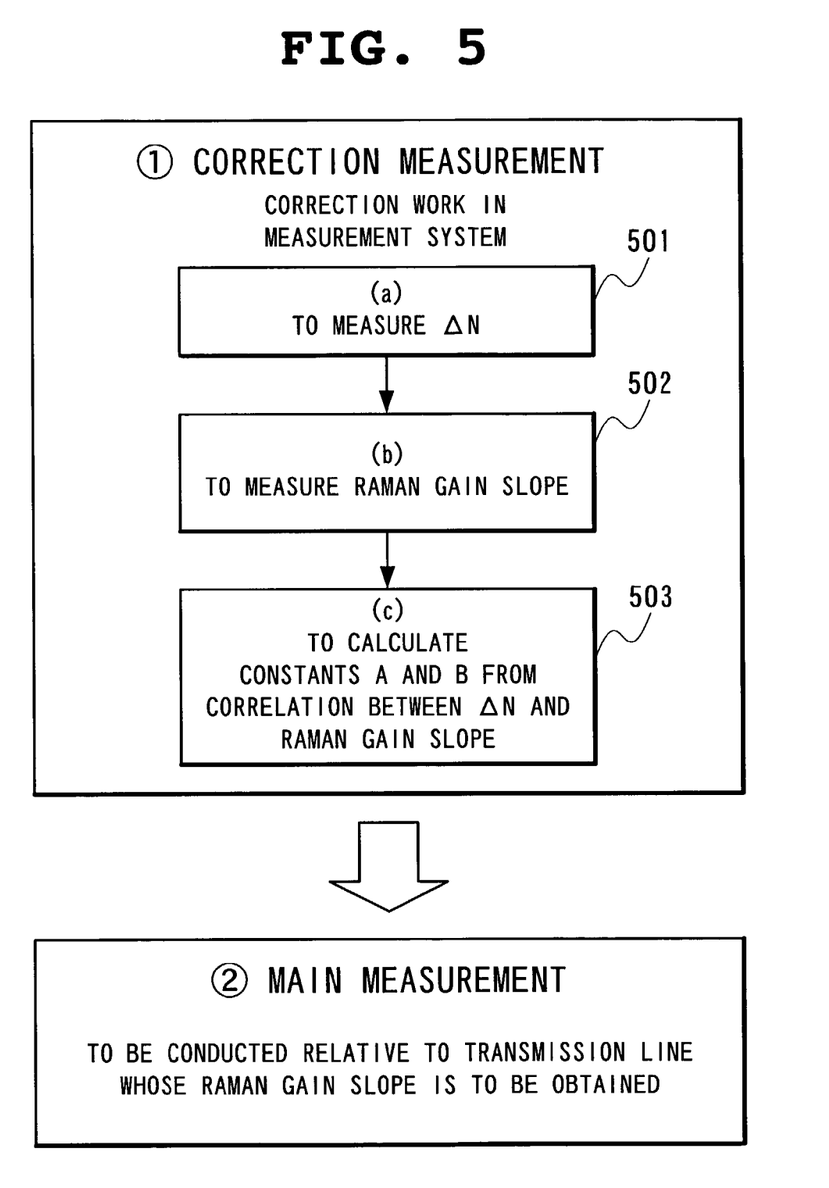
FIG. 5 is a flow chart for use in explaining a flow of processing according to the embodiment of the present invention.

FIG. 5 is a flow chart showing a flow of the present invention. Procedure of the present invention is mainly composed of two stages, (1) correction by a noise light measurement system and (2) measurement of Raman gain slope with respect to a transmission line whose Raman gain characteristics are yet to be known. In the following, (1) and (2) will be referred to as correction measurement ① and main measurement ②, respectively.

[Correction Measurement ①]

Correction measurement is intended to obtain coefficients A and B dependent on the measurement system 20 and measurement conditions. Correction measurement ① is composed of two measurement steps, (a) Step 501 of measuring an amount ΔN of change of power of noise light and (b) Step 502 of measuring Raman gain slope, and (c) Step 503 of obtaining the coefficients A and B of the expression 2 of the measurement system 20 based on measurement results of (a) and (b) obtained relative to a plurality of test optical fibers.

First, description will be made of a structure for conducting the correction measurement ① with reference to FIG. 4. In the following, a direction of output from a test optical fiber 10 toward the end A will be referred to as a forward direction and a direction of input from the end A to the test optical fiber 10 will be referred to as a backward direction. In addition, a wavelength band receiving a gain by a pump light wavelength will be referred to as a signal wavelength band.

A WDM coupler 21 for multiplexing and demultiplexing a pump wavelength band and a signal wavelength band is connected to the end A. To a pump wavelength band port of the WDM coupler 21, a pump light source 22 is connected to make pump light enter the test optical fiber 10 in the backward direction. The test optical fiber 10 is desirably an experimental fiber spool in terms of work efficiency. Between the WDM coupler 21 and the end A, further connected is a TAP coupler 23 for branching part of forward direction light.

In the following, among three ports of the TAP coupler 23, a port connected to the transmission line will be referred to as an input port, a port connected to the WDM coupler 21 as a main port and the remaining port as a monitor port. The branch ratio between the main port and the monitor port is set to be 95:5. To the monitor port, a WDM coupler 24 for demultiplexing a pump wavelength band and a signal wavelength band is connected. To a pump wavelength band port of the WDM coupler 24, a light termination unit 25 is connected, while to a signal wavelength band port, a light receiver 26 for measuring power of noise light is connected.

Insertion of the WDM coupler 24 prevents returned light of the pump light from entering the light receiver 26. Between the WDM coupler 24 and the light receiver 26, an interfering light removal filter 27 is provided to prevent light other than noise light generated by the Raman pump from entering the light receiver 26. In addition, to the output of the light receiver 26, a low-pass filter whose cut-off frequency is 10 Hz is connected so as to provide a minimum necessary observation band, thereby improving sensitivity. Provided at an end B is a test light source 30 for measuring the Raman gain slope in the same manner as that shown in FIG. 6. Provided at a signal wavelength band port of the WDM coupler 21 is a light receiver 40 for measuring the power of the test light.

Figure 4:
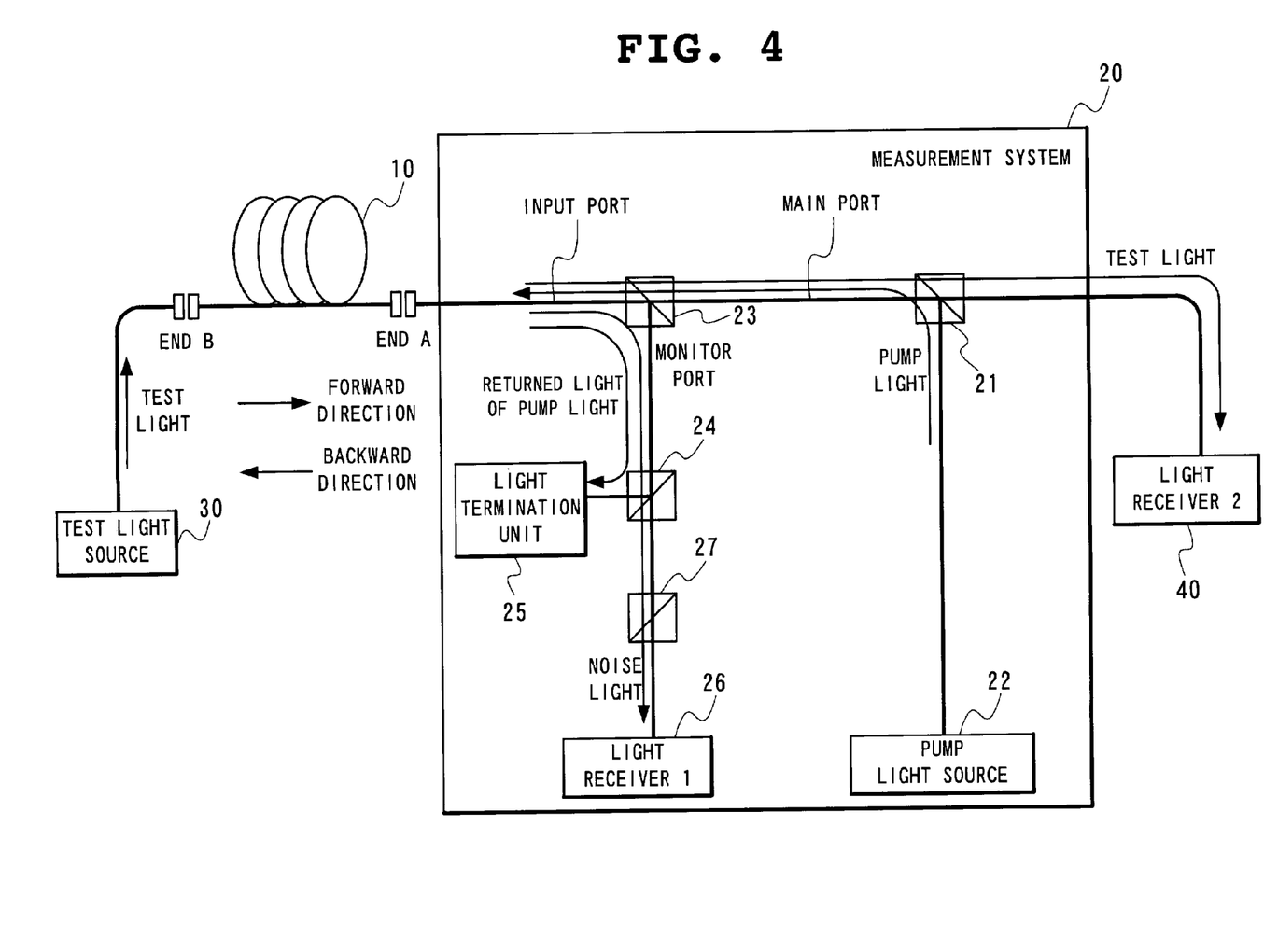
FIG. 4 is a diagram showing a structure for conducting correction measurement according to the embodiment of the present invention.

In the structure shown in FIG. 4, the portions other than the test light source 30, the test optical fiber 10 and the light receiver 40 serves as the measurement system 20 for use in the main measurement.

With the above-described structure shown in FIG. 4, one may conduct correction measurements, that is, measurements for obtaining the coefficients A and B. The measuring procedures will be described in the following.

(a) Measurement of Amount ΔN of Change of Power of Noise Light (Step 501)

With power of the pump light output at the end A assumed to be PP1(W), measure the power of noise light detected by the light receiver 26 and set the same to be NP1(dBm). Similarly, with power of the pump light output at the end A assumed to be PP2(W), measure the power of noise light and set the same to be NP2 (dBm). Based on the thus obtained measurement values, obtain an amount of change of power of the noise light, $\Delta N$ (dB/W)=(NP2−NP1)/(PP2−PP1).

(b) Raman Gain Slope Measurement (Step 502)

According to the method shown in FIG. 6 which is a conventional Raman gain slope measuring method, by means of the light receiver 40, measure and correct Raman gain slope of the test optical fiber 10 whose amount of change of power of noise light is measured in (a).

Although when the test optical fiber 10 whose Raman gain slope is known is used, no further measurement of the Raman gain slope is required, since even a slight difference in a connection loss at the end A in FIG. 4 will cause a change of the Raman gain slope observed by the light receiver 40, it is desirable, for more precise correction, to consistently conduct measurements of the above-described (a) and (b) without changing the connection state of the end A.

Although there occurs a need for changing a wavelength of test light depending on a gain slope measurement wavelength, modification of the test light wavelength may be omitted. More specifically, when a gain profile is known in advance, the Raman gain slope relative to a plurality of pump wavelengths can be measured based on a gain ratio between a test light wavelength and a gain slope measurement wavelength by using test lights of the same wavelength.

(c) Calculation of the Coefficients A and B (Step 503)

Obtain the coefficients A and B by executing the measurement of (a) and (b) using a plurality of the test optical fibers 10 to obtain a correlation graph such as shown in FIG. 2. In order to increase precision, it is desirable to take as many samples as possible. In FIG. 2, 16 test fiber samples are measured.

As a measurement system S, refer to a measurement system in a case where under wavelength characteristic conditions shown in FIG. 3, with PP1=0.100(W) and PP2=0.150(W), Raman gain slope is defined at a wavelength at which a Raman gain profile of each pump wavelength has a peak. From the measurements (a) and (b) relative to the plurality of test optical fibers 10, coefficients A and B of the measurement system S are obtained as shown in Table 1 illustrated below, in which as the test optical fibers 10, a single mode fiber (SMF) and a non zero dispersion shifted fiber (NZDSF) are used:

TABLE 1

| PUMP WAVE-LENGTH (nm) | 1424 | 1437 | 1449 | 1465 | 1494 |
| --- | --- | --- | --- | --- | --- |
| A | 2.5119 | 2.7427 | 3.0133 | 3.0764 | 3.1609 |
| B | −129.61 | −131.66 | −137.66 | −143.49 | −156.91 |

[Main Measurement ②]

FIG. 1 shows the structure for conducting the main measurement ②. Remove the test light source 30, the test optical fiber 10 and the light receiver 40 from the structure shown in FIG. 4 and incorporate a measurement system subjected to correction measurement into the structure shown in FIG. 1 without change. This enables the main measurement ② to be executed based on a result of the correction measurement ①.

Description will be made of a method of measuring, in the structure shown in FIG. 1, the Raman gain slope of an actually laid optical fiber.

First, for accurate measurement of the power of the noise light, put the light receiver into a state where no light other than noise light generated by Raman pump (hereinafter referred to as interfering light) enters. In order to prevent output of light from the end A, stop a transmission signal on the side of the end B and provide the interfering light removal filer 27 for removing interfering light between the WDM coupler 24 and the light receiver 26. If the interfering light removal filter 27 is unnecessary, it can be omitted and in such a case, the correction measurement ① should be conducted with a structure in which no interfering light removal filter is provided.

In the same manner as that of a case where an amount ΔN of change of power of noise light is obtained in the correction measurement ①, measure an amount A N of change of power of noise light on the transmission line to be measured. By applying thus obtained amount ΔN of change of power of noise light and the coefficients A and B obtained by the correction measurement to the expression 2, the Raman gain coefficient can be obtained.

When in the above-described measurement system S, the main measurement ② is conducted with respect to SMF which is not used in the correction measurement ①, NP1 is set at PP1 of 0.100 (W) and NP2 at PP2 of 0.150 (W) and an amount ΔN of change of power of noise light are as shown in Table 2 set forth below. Accordingly, based on the coefficients A and B in Table 1 which are obtained by the correction measurement, Raman gain slope Γ of each pump wavelength is determined as shown in Table 3 set forth below.

TABLE 2

| PUMP WAVE-LENGTH (nm) | 1424 | 1437 | 1449 | 1465 | 1494 |
|---|---|---|---|---|---|
| NP1 (dBm) | −35.34 | −34.38 | −33.94 | −33.85 | −33.69 |
| NP2 (dBm) | −32.38 | −31.12 | −31.12 | −30.98 | −30.65 |
| ΔN (dB/W) | 59.2 | 65.1 | 56.3 | 57.4 | 60.8 |

TABLE 3

| PUMP WAVELENGTH (nm) | 1424 | 1437 | 1449 | 1465 | 1494 |
|---|---|---|---|---|---|
| Γ (dB/W) | 30.7 | 33.9 | 32.0 | 33.1 | 35.3 |

Although in the present embodiment, a PIN photo-diode (Pin-PD) is used as the light receiver 26, application of other devices or measuring units having a function of measuring a direct current component of signal wavelength band optical power is also effective. It is for example effective to apply an avalanche photo-diode (APD), a calorie meter and an optical power meter.

Although in the present embodiment, an optical power meter is used as the light receiver 40, application of other measuring unit or device having a function of measuring signal wavelength band optical power is also effective. It is for example effective to apply an optical spectrum analyzer, a PIN photo-diode (Pin-PD), an avalanche photo-diode (APD) and a calorie meter.

In the present embodiment, while a dielectric multilayer film WDM coupler is used for preventing input of backward scattered light of pump light to the light receiver, other devices can be also applied which have an optical filtering function of cutting a pump light wavelength band and making a signal light wavelength band transit. It is for example effective to apply a grating type wavelength filter, a Fabry-Perot type wavelength filter and a Mach-Zehnder interferometer type wavelength filter.

Although in the present embodiment, a dielectric multi-layer film filter is used as the interfering light removal filter 27 for cutting interfering light, application of other devices is also effective which has a filtering function of cutting an interfering light wavelength and making noise light sufficient for measurement transit. It is for example effective to apply a grating type wavelength filter, a Fabry-Perot type wavelength filter and a Mach-Zehnder interferometer type wavelength filter.

Although in the present embodiment, the fiber-fused type coupler is used as the TAP coupler 23, other devices can be also applied that have a function of making a pump light source wavelength band, an amplified wavelength band and a gain measurement wavelength transit and branching the same by a desired branch ratio. Effective, for example, is application of a dielectric multilayer film type coupler.

While as the pump light source 22 in the present embodiment, Fabry-Perot laser whose wavelength is narrowed by fiber grating is used, it is also effective to apply a laser which is capable of outputting sufficient power and whose wavelength is variable.

Although the present embodiment has been described with respect to a system of obtaining each of the coefficients A and B of the linear expression as Expression 2 for use in calculating Raman gain slope from an amount of change of noise light by a correction measurement, and substituting the amount of change of noise light in the linear expression to calculate Raman gain slope in the main measurement, when the coefficients A and B of the linear expression (Expression 2) for calculating the Raman gain slope from an amount of change of noise light in a target of measurement are known, no correction measurement is necessary. In other words, by setting the linear expression as Expression 2 at the measurement system by using the already known coefficients A and B, the measurement system is allowed to substitute the amount of change of noise light of an optical fiber to be measured in the set linear expression to calculate the Raman gain slope of the optical fiber to be measured.

Although in the present embodiment, SMF and NZDSF are used as the test optical fibers 10, 1.55 μm dispersion shifted fiber (DSF) or the like can be also applied.

Although in the present embodiment, SMF is used as the transmission line optical fiber 100, NZDSF, DSF or the like can be also applied.

In addition, although in the present embodiment, the present invention has been described with respect to the arrangement of the backward pump Raman amplification, since the arrangement of the forward pump Raman amplification also enables measurement of a gain from power of noise light by seizing a relationship between power of noise light and a gain in advance, the present invention is also applicable to such forward pump Raman amplification.

Although the present invention has been described with respect to the preferred modes and embodiment in the foregoing, the present invention is not limited to the above-described modes and embodiment but can be realized in various forms within a scope of its technical idea.

As described in the foregoing, the present invention enables measurement of Raman gain slope by work only at one end of a transmission line without changing wiring at a signal transmission state. In addition, the necessary measurement unit is a simple and inexpensive light receiver. As a result, even when simultaneous work at the opposite ends of a transmission line is hard to do, Raman gain slope measurement excellent in workability can be realized at low costs.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A Raman gain slope measuring method of measuring Raman gain slope which is a value obtained by normalizing a gain generated by Raman amplification caused by pump light incident on an optical fiber by power of the pump light in question, comprising the step of
measuring power of noise light generated by Raman amplification in an optical fiber to be measured to obtain Raman gain slope of the optical fiber in question.

2. The Raman gain slope measuring method as set forth in claim 1, wherein
the power of the pump light incident on said optical fiber is changed in two or more stages and an amount of change of noise light which is a value obtained by normalizing an amount of change of power of corresponding said noise light by an amount of change of the power of said pump light is measured to obtain Raman gain slope of the optical fiber in question.

3. The Raman gain slope measuring method as set forth in claim 2, further comprising:
a first step of obtaining, from amounts of change of noise light obtained relative to a plurality of kinds of optical fibers whose Raman gain slope is known, a relational expression between an amount of change of noise light and Raman gain slope, and
a second step of calculating, from an amount of change of noise light of an optical fiber whose gain slope is to be measured, Raman gain slope of the optical fiber in question based on said relational expression between the amount of change of noise light and Raman gain slope which is obtained at said first step.

4. The Raman gain slope measuring method as set forth in claim 3, wherein
at said first step, in the measurement made relative to a plurality of kinds of optical fibers, an amount of change of noise light and Raman gain slope are measured consistently without changing a measurement system with respect to each optical fiber.

5. The Raman gain slope measuring method as set forth in claim 3, wherein
at said first step, with said relational expression between the amount of change of noise light and Raman gain slope assumed to be a linear expression, a coefficient of said linear expression is calculated.

6. The Raman gain slope measuring method as set forth in claim 5, wherein
by substituting the amount of change of noise light of said optical fiber to be measured in said linear expression which is the relational expression between the amount of change of noise light and Raman gain slope obtained at said first step, Raman gain slope of the optical fiber in question is calculated.

7. The Raman gain slope measuring method as set forth in claim 1, wherein
the power of said pump light is power which realizes a Raman gain not less than 3 dB by the application to said optical fiber.

8. The Raman gain slope measuring method as set forth in claim 1, wherein
the power of the pump light incident on said optical fiber is changed in two or more stages and an amount of change of noise light which is a value obtained by normalizing an amount of change of power of corresponding said noise light by an amount of change of the power of said pump light is measured to obtain Raman gain slope of the optical fiber in question,
the power of said pump light is power which realizes a Raman gain not less than 3 dB by the application to said optical fiber.

9. The Raman gain slope measuring method as set forth in claim 2, further comprising:
a first step of obtaining, from amounts of change of noise light obtained relative to a plurality of kinds of optical fibers whose Raman gain slope is known, a relational expression between an amount of change of noise light and Raman gain slope, and
a second step of calculating, from an amount of change of noise light of an optical fiber whose gain slope is to be measured, Raman gain slope of the optical fiber in question based on said relational expression between the amount of change of noise light and Raman gain slope which is obtained at said first step,
wherein the power of said pump light is power which realizes a Raman gain not less than 3 dB by the application to said optical fiber.

10. A Raman gain slope measuring device for measuring Raman gain slope which is a value obtained by normalizing a gain generated by Raman amplification caused by pump light incident on an optical fiber by power of the pump light in question, comprising
a pump light source for directing pump light to be incident on said optical fiber; and
means, utilizing said pump light, for measuring power of noise light generated by Raman amplification in said optical fiber to obtain said Raman gain slope of the optical fiber.

11. The Raman gain slope measuring device as set forth in claim 10, further comprising
means for changing the power of the pump light incident on said optical fiber in two or more stages and measuring an amount of change of noise light which is a value obtained by normalizing an amount of change of power of corresponding said noise light by an amount of change of the power of said pump light to obtain Raman gain slope of the optical fiber in question.

12. The Raman gain slope measuring device as set forth in claim 11, further comprising:
first means for obtaining, from amounts of change of noise light obtained relative to a plurality of kinds of optical fibers whose Raman gain slope is known, a relational expression between an amount of change of noise light and Raman gain slope, and
second means for calculating, from an amount of change of noise light of an optical fiber whose gain slope is to be measured, Raman gain slope of the optical fiber to be measured in question based on said relational expression between the amount of change of noise light and Raman gain slope which is obtained by said first means.

13. The Raman gain slope measuring device as set forth in claim 12, wherein the means for measuring power of noise light comprises:
- optical coupling means for coupling the pump light in question with the optical fiber in question,
- light receiving means for measuring power of noise light output from the optical fiber in question, and
- light distributing means for introducing the noise light in question from the optical fiber in question into the light receiving means in question.

14. The Raman gain slope measuring device as set forth in claim 12, wherein
- at said first means, in the measurement made relative to a plurality of kinds of optical fibers, an amount of change of noise light and Raman gain slope are measured consistently without changing a measurement system with respect to each optical fiber.

15. The Raman gain slope measuring device as set forth in claim 12, wherein
- at said first means, with said relational expression between the amount of change of noise light and Raman gain slope assumed to be a linear expression, a coefficient of said linear expression is calculated.

16. The Raman gain slope measuring device as set forth in claim 15, wherein
- by substituting the amount of change of noise light of said optical fiber to be measured in said linear expression which is the relational expression between the amount of change of noise light and Raman gain slope obtained by said first means, Raman gain slope of the optical fiber to be measured in question is calculated.

17. The Raman gain slope measuring device as set forth in claim 10, wherein
- the power of said pump light is power which realizes a Raman gain not less than 3 dB by the application to said optical fiber.

18. The Raman gain slope measuring device as set forth in claim 10, further comprising
- means for changing the power of the pump light incident on said optical fiber in two or more stages and measuring an amount of change of noise light which is a value obtained by normalizing an amount of change of power of corresponding said noise light by an amount of change of the power of said pump light to obtain Raman gain slope of the optical fiber in question,
- wherein the power of said pump light is power which realizes a Raman gain not less than 3 dB by the application to said optical fiber.

19. The Raman gain slope measuring device as set forth in claim 11, further comprising:
- first means for obtaining, from amounts of change of noise light obtained relative to a plurality of kinds of optical fibers whose Raman gain slope is known, a relational expression between an amount of change of noise light and Raman gain slope, and
- second means for calculating, from an amount of change of noise light of an optical fiber whose gain slope is to be measured, Raman gain slope of the optical fiber to be measured in question based on said relational expression between the amount of change of noise light and Raman gain slope which is obtained by said first means,
- wherein the power of said pump light is power which realizes a Raman gain not less than 3 dB by the application to said optical fiber.

20. The Raman gain slope measuring device as set forth in claim 10, which
- being incorporated in a transmission or reception terminal station or a repeater plant of an optical fiber transmission system, measures gain slope of the optical fiber as a signal transmission line, and
- is applied to Raman amplification targeting signal light transmitted through said optical fiber as a signal transmission line.

21. The Raman gain slope measuring device as set forth in claim 10, which
- being incorporated in a transmission or reception terminal station or a repeater plant of an optical fiber transmission system, measures gain slope of the optical fiber as a signal transmission line, and
- is applied to Raman amplification targeting signal light transmitted through said optical fiber as a signal transmission line,
- further comprising
- means for changing the power of the pump light incident on said optical fiber in two or more stages and measuring an amount of change of noise light which is a value obtained by normalizing an amount of change of power of corresponding said noise light by an amount of change of the power of said pump light to obtain Raman gain slope of the optical fiber in question.

22. The Raman gain slope measuring device as set forth in claim 11, which
- being incorporated in a transmission or reception terminal station or a repeater plant of an optical fiber transmission system, measures gain slope of the optical fiber as a signal transmission line, and
- is applied to Raman amplification targeting signal light transmitted through said optical fiber as a signal transmission line,
- further comprising:
- first means for obtaining, from amounts of change of noise light obtained relative to a plurality of kinds of optical fibers whose Raman gain slope is known, a relational expression between an amount of change of noise light and Raman gain slope, and
- second means for calculating, from an amount of change of noise light of an optical fiber whose gain slope is to be measured, Raman gain slope of the optical fiber to be measured in question based on said relational expression between the amount of change of noise light and Raman gain slope which is obtained by said first means.

23. An optical fiber transmission system for transmitting signal light from a transmission terminal station to a reception terminal station through an optical fiber as a signal transmission line, wherein
- said transmission or reception terminal station or a repeater plant includes a Raman gain slope measuring device for measuring Raman gain slope which is a value obtained by normalizing a gain generated by Raman application caused by pump light incident on said optical fiber by power of the pump light in question,
- said Raman gain slope measuring device including means for obtaining, by measuring power of noise light generated by Raman amplification in an optical fiber to be measured, Raman gain slope of the optical fiber in question.

24. The optical fiber transmission system as set forth in claim 23, wherein
- said Raman gain slope measuring device includes means for changing the power of the pump light incident on said optical fiber in two or more stages and measuring an amount of change of noise light which is a value obtained by normalizing an amount of change of power of corresponding said noise light by an amount of change of the power of said pump light to obtain Raman gain slope of the optical fiber in question.

25. The optical fiber transmission system as set forth in claim 24, wherein said Raman gain slope measuring device includes:

first means for obtaining, from amounts of change of noise light obtained relative to a plurality of kinds of optical fibers whose Raman gain slope is known, a relational expression between an amount of change of noise light and Raman gain slope, and second means for calculating, from an amount of change of noise light of an optical fiber whose gain slope is to be measured, Raman gain slope of the optical fiber to be measured in question based on said relational expression between the amount of change of noise light and Raman gain slope which is obtained by said first means.

26. The optical fiber transmission system as set forth in claim 25, wherein said Raman gain slope measuring device includes a pump light source for making pump light be incident on said optical fiber, optical coupling means for coupling the pump light in question with the optical fiber in question, light receiving means for measuring power of noise light output from the optical fiber in question, and light distributing means for introducing the noise light in question from the optical fiber in question into the light receiving means in question.

27. The optical fiber transmission system as set forth in claim 26, wherein said Raman gain slope measuring device includes means for measuring power of said signal light transmitted from a signal light source which emits signal light through said optical fiber with respect to power of each stage of said pump light incident on said optical fiber to measure Raman gain slope of said optical fiber.

28. The optical fiber transmission system as set forth in claim 25, wherein at said first means, in the measurement made relative to a plurality of kinds of optical fibers, an amount of change of noise light and Raman gain slope are measured consistently without changing a measurement system with respect to each optical fiber.

29. The optical fiber transmission system as set forth in claim 25, wherein in said first means, with said relational expression between the amount of change of noise light and Raman gain slope assumed to be a linear expression, a coefficient of said linear expression is calculated.

30. The optical fiber transmission system as set forth in claim 29, wherein said Raman gain slope measuring device substitutes the amount of change of noise light of said optical fiber to be measured in said linear expression which is the relational expression between the amount of change of noise light and Raman gain slope obtained by said first means to calculate Raman gain slope of the optical fiber to be measured in question.

31. The optical fiber transmission system as set forth in claim 23, wherein the power of said pump light is power which realizes a Raman gain not less than 3 dB by the application to said optical fiber.

32. The optical fiber transmission system as set forth in claim 23, wherein said Raman gain slope measuring device includes means for changing the power of the pump light incident on said optical fiber in two or more stages and measuring an amount of change of noise light which is a value obtained by normalizing an amount of change of power of corresponding said noise light by an amount of change of the power of said pump light to obtain Raman gain slope of the optical fiber in question, the power of said pump light is power which realizes a Raman gain not less than 3 dB by the application to said optical fiber.

33. The optical fiber transmission system as set forth in claim 24, wherein said Raman gain slope measuring device includes:

first means for obtaining, from amounts of change of noise light obtained relative to a plurality of kinds of optical fibers whose Raman gain slope is known, a relational expression between an amount of change of noise light and Raman gain slope, and second means for calculating, from an amount of change of noise light of an optical fiber whose gain slope is to be measured, Raman gain slope of the optical fiber to be measured in question based on said relational expression between the amount of change of noise light and Raman gain slope which is obtained by said first means, the power of said pump light is power which realizes a Raman gain not less than 3 dB by the application to said optical fiber.

* * * * *